United States Patent
Birk et al.

(10) Patent No.: US 6,654,166 B2
(45) Date of Patent: Nov. 25, 2003

(54) SCANNING MICROSCOPE WITH MULTIBAND ILLUMINATION AND OPTICAL COMPONENT FOR A SCANNING MICROSCOPE WITH MULTIBAND ILLUMINATION

(75) Inventors: Holger Birk, Meckesheim (DE); Rafael Storz, Bammental (DE); Johann Engelhardt, Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 48 days.

(21) Appl. No.: 09/881,047

(22) Filed: Jun. 15, 2001

(65) Prior Publication Data

US 2002/0050564 A1 May 2, 2002

(30) Foreign Application Priority Data

Jun. 17, 2000 (DE) .......................................... 100 30 013
Mar. 29, 2001 (DE) .......................................... 101 15 577

(51) Int. Cl.[7] ............................ G02B 21/06; G02B 21/00
(52) U.S. Cl. ......................... 359/389; 359/368; 359/385
(58) Field of Search ................................. 359/368–390

(56) References Cited

U.S. PATENT DOCUMENTS

| | | | | | |
|---|---|---|---|---|---|
| 5,537,247 A | * | 7/1996 | Xiao | ........................... | 359/368 |
| 5,786,890 A | * | 7/1998 | Noh | ........................... | 356/225 |
| 5,861,984 A | * | 1/1999 | Schoppe | ..................... | 359/385 |
| 5,903,688 A | * | 5/1999 | Engelhardt et al. | ............ | 385/31 |
| 6,108,127 A | * | 8/2000 | Atkinson | ..................... | 359/389 |

FOREIGN PATENT DOCUMENTS

DE    198 29 954   *  1/2000
EP    495 930     *  4/1999

OTHER PUBLICATIONS

Cregan et al, "Single–Mode Photonic Band Gap Guidance of Light in Air", Science vol. 285, Sep. 3, 1999, pp. 1537–1539.*
U.S. patent application Ser. No. 09/880,825, Birk et al., filed Jun. 15, 2001.
U.S. patent application Ser. No. 09/881,046, Birk et al., filed Jun. 15, 2001.
U.S. patent application Ser. No. 09/881,048, Birk et al., filed Jun. 15, 2001.
U.S. patent application Ser. No. 09/881,049, Birk et al., filed Jun. 15, 2001.
U.S. patent application Ser. No. 09/881,062, Birk et al., filed Jun. 15, 2001.
U.S. patent application Ser. No. 09/881,212, Birk et al., filed Jun. 15, 2001.
U.S. patent application Ser. No. 09/882,355, Birk et al., filed Jun. 18, 2001.

* cited by examiner

*Primary Examiner*—Thong Nguyen
(74) *Attorney, Agent, or Firm*—Foley & Lardner

(57) ABSTRACT

A scanning microscope is disclosed, through which a sample (14) can be illuminated and detected. An illumination pinhole and a detection pinhole (10, 16) are respectively arranged in the illumination beam path and in the detection beam path (8, 15), an optical component (4), which generates at least to some extent spectrally broadened illumination light, is provided in the illumination beam path (8). A polarization-independent and wavelength-independent beam splitter (11) is arranged in a fixed position in the illumination beam path and the detection beam path (8, 15).

18 Claims, 3 Drawing Sheets

SCANNING MICROSCOPE WITH MULTIBAND ILLUMINATION AND OPTICAL COMPONENT FOR A SCANNING MICROSCOPE WITH MULTIBAND ILLUMINATION

CROSS REFERENCE TO RELATED APPLICATIONS

This invention claims priority of the German patent applications 100 30 013.8 and 101 15 577.8 which are incorporated by reference herein.

FIELD OF THE INVENTION

The invention relates to a scanning microscope with multiband illumination. In particular, the invention relates to a scanning microscope with an objective, through which a sample can be illuminated and detected, the objective being arranged in both an illumination beam path and a detection beam path, and an illumination pinhole and a detection pinhole being respectively arranged in the illumination beam path and in the detection beam path.

The invention furthermore relates to an optical component for a scanning microscope with multiband illumination.

BACKGROUND OF THE INVENTION

European Patent EP-0 495 930 discloses a confocal microscope system for multicolour fluorescence. A dichroic mirror, which transmits a plurality of wavelength ranges, is provided in the detection beam path and observation beam path of the microscope. The dichroic mirror disclosed here is, however, configured only for specific wavelength ranges. Should the need arise that it is desirable to carry out studies with another combination of wavelength ranges, then it will be necessary to replace the dichroic mirror with one that is suitable for this combination of wavelength ranges. This considerably restricts the flexible usability of the instrument.

German laid-open patent specification 198 29 954 discloses a beam splitter in a laser scanning microscope. The beam splitter in the beam path of the laser scanning microscope is used to separate the excitation beam path and emission beam path. The beam splitter preferably consists of coloured glasses which can be changed. So that the coloured glasses can be changed, they are arranged on a splitter revolver and are rotated into the beam part according to use. This device has the disadvantage, however, that readjustment is often necessary in the case of changeable optical elements in the beam path of a laser scanning microscope.

SUMMARY OF THE INVENTION

It is an object of the present invention to provide a scanning microscope which makes it possible to study a sample with various wavelengths and/or wavelength ranges, while obviating the need to readjust wavelength-specific elements in the beam path.

The object is achieved by a scanning microscope comprising: an objective through which a sample can be illuminated and detected, the objective being arranged in both an illumination beam path and a detection beam path, an illumination pinhole being arranged in the illumination beam path, a detection pinhole being arranged in the detection beam path, an optical component arranged in the illumination beam path, which generates spectrally broadened illumination light, and an essentially polarization-independent and wavelength-independent beam splitter, which is arranged in a fixed position in the illumination beam path and the detection beam path.

It is another object of the invention to provide an optical component which contains, firmly mounted, all the elements that are sensitive with respect to adjustment, in order hence to permit straightforward replacement.

The object is achieved by an optical component for use in an illumination and detection beam path of a scanning microscope comprising: a polarization-independent and wavelength-independent beam splitter, an illumination pinhole, a detection pinhole and a reference detector.

It is advantageous to combine an optical component with a casing, and to fit it as a module in the beam path of a microscope, preferably a scanning microscope. The optical component comprises a beam splitter, an illumination pinhole, a detection pinhole and a reference detector. The optical component is arranged in the illumination beam path and the detection beam path of the scanning microscope in such a way that the illumination light is incident with respect to the normal of the beam splitter at an angle which is such that polarization effects are minimal.

It is furthermore advantageous if at least one adjustment means is respectively assigned to the beam splitter, the illumination pinhole and the detection pinhole.

Added to this, the optical component can be used in a scanning microscope. The scanning microscope comprises a light source, which consists of at least one laser and a microstructured material, into which the light from the laser can be injected. It has been shown that it is particularly advantageous if a reference detector is arranged in a reference beam defined by the light passing through the beam splitter. The reference detector derives from the light of the reference beam an electronic value that can be sent to control electronics. According to the electronic value, the intensity of the light source is controlled in such a way that there is always a constant light power at a sample.

Another advantage is that the optical component is enclosed by a casing. This very substantially prevents incorrect positioning of and/or damage to the individual elements in the casing. The casing comprises a first opening for entry of the illumination light, a second opening for exit of the illumination light and for entry of the detection light, and a third opening for exit of the detection light. The illumination pinhole is assigned to the first opening and the detection pinhole is assigned to the third opening. Furthermore, the beam splitter is arranged in a fixed position with respect to the illumination beam path and the detection beam path.

Other advantageous configurations of the invention can be found in the dependent claims.

BRIEF DESCRIPTION OF THE DRAWINGS

The subject-matter of the invention is schematically represented in the drawing and will be described below with the aid of the figures, in which.

DETAILED DESCRIPTION OF THE INVENTION

Figure 1:
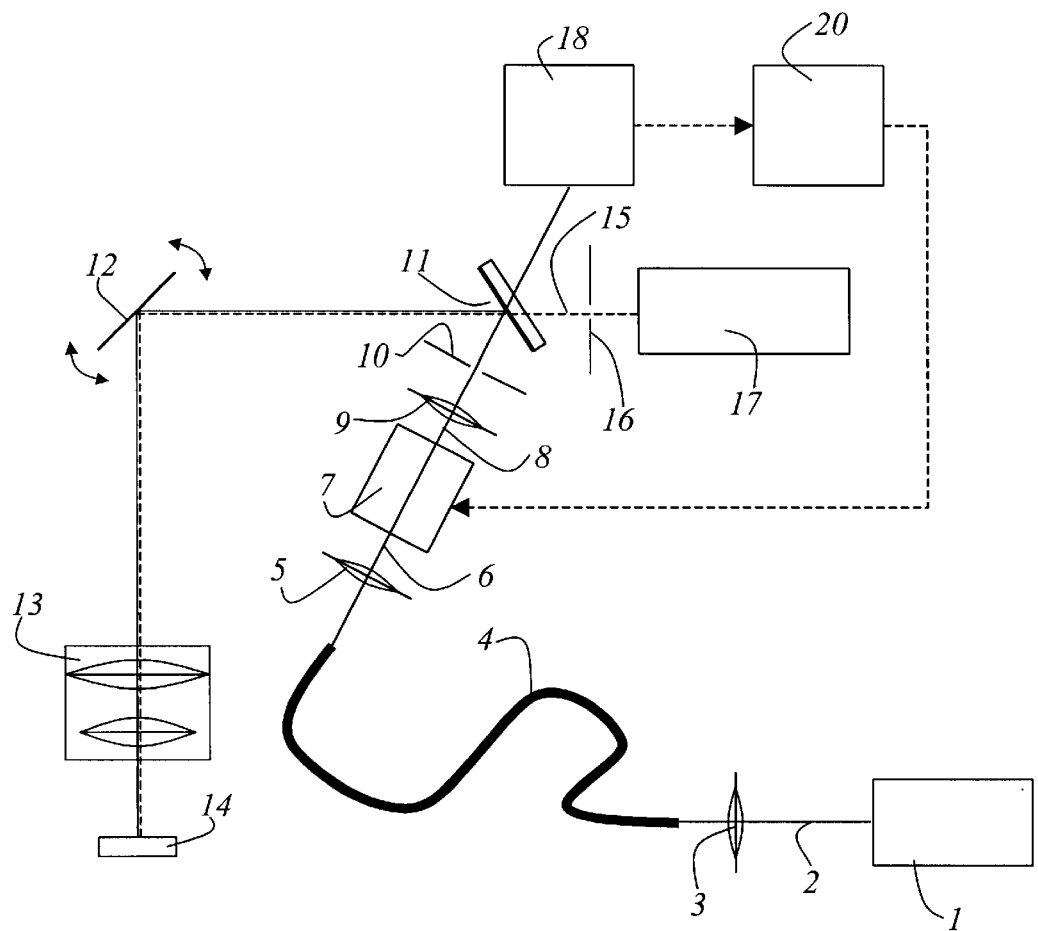
FIG. 1: shows a schematic view of a confocal microscope with the arrangement according to the invention.

FIG. 1 shows a confocal microscope, which has an optical component 4 for spectrally broadening a laser pulse generated by a pulse laser 1. The pulse laser 1 defines a pulsed laser beam 2, which is guided through the optical component 4. The optical component 4 is a "photonic band gap material", or a correspondingly microstructured fibre or a conventional tapered fibre. When a fibre is used, the laser beam 2 is injected into the fibre by means of an input lens 3. Spectrally broadband illumination light 6 emerges from the optical component 4 and is fed by a first lens 5 to a wavelength-selecting and/or intensity-selecting means 7. The selected wavelengths or wavelength ranges are projected as illumination light 8 through a second lens 9 onto an illumination pinhole 10. The illumination light 8 then strikes a beam splitter 11. From the beam splitter 11, the spectrally broadband illumination light 8 proceeds to a scanning mirror 12. An objective 13, which projects the illumination light 8 onto a sample 14, is connected downstream of the scanning mirror 12. The light reflected or emitted by the sample 14 defines an observation beam path, or detection light 15. The detection light 15 is projected onto a detection pinhole 16, which is located in front of a detector 17. Using the optical component 4, it is possible to generate the laser light needed for studying the sample 14 in accordance with the desired spectrum, or wavelength range. The wavelength-selecting and/or intensity-selecting means 7 can be configured e.g. as an SP module or as a combination of two prisms with displaceable and width-adjustable slits. The user can hence straightforwardly select the required wavelength or the required wavelength range for studying the sample 14.

As already mentioned above, the beam splitter 11 diverts the light onto the scanning mirror 12. Some of the light passes through the beam splitter 11 and defines a light loss. This component of the light is lost to the observation or measurement. For this reason, a reference detector 18 is assigned to the illumination light 8 passing through the beam splitter 11. The reference detector 18 determines the amount of light lost and derives therefrom an electronic value which is fed to control electronics 20. The control electronics 20 are connected to the wavelength-selecting and/or intensity-selecting means 7. The control electronics 20 control the intensity of the illumination light 8 such that a constant light power always reaches the sample 14. For example, a control loop for light-power stabilization may be provided in such a way that it parasitically measures the light power in the beam path of the microscope and, for example with the aid of an acousto-optical or electro-optical element as the intensity-selecting means 7, it keeps the sample illumination light power constant. To that end, LCD attenuators could also be used.

Figure 2:
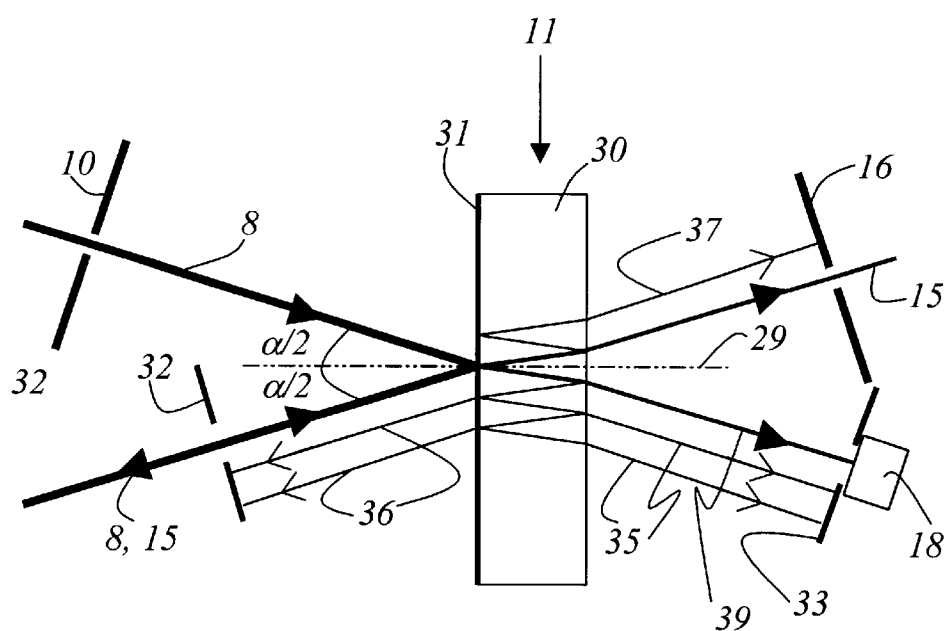
FIG. 2: shows a view of the spatial arrangement of the beam splitter with respect to the illumination light and the detection light.

The beam splitter 11 acts on the illumination light 8 and the detection light 15, and is designed as a polarization-independent and wavelength-independent beam splitter and is arranged in a fixed position. In FIG. 2, the spatial position of the beam splitter 11 with respect to the illumination pinhole 10 and the detection pinhole 16 is shown. The beam splitter 11 consists of a substrate 30, which has a coating 31 applied on one side. The substrate 30 consists e.g. of glass or quartz. The substrate has a thickness of a few millimeters so that, as mentioned above, the secondary reflections 35, 36 can be definitively eliminated by apertures 32, 33. The substrate surfaces should also be as parallel as possible, in order to avoid prism effects and the consequent colour aberrations. The coating 31 may consist e.g. of silver or aluminium, and may optionally be provided with a protective layer (not shown). The beam splitter 11 is arranged in the beam path in such a way that the illumination light 8 firstly strikes the coating 31 of the beam splitter 11. With respect to the normal 29 to the beam splitter 11, the illumination light 8 has a small angle $\alpha/2$. The angle $\alpha/2$ is in the range between 1° and 30°, which is sufficient to avoid polarization effects. The majority of the illumination light 8 is reflected by the coating, likewise at the angle $\alpha/2$, so that the illumination light 8 is diverted in the direction of the sample 14. A small fraction of the illumination light 8 passes through the beam splitter 11 and defines a reference beam 39 which, after emerging from the beam splitter 11, strikes the reference detector 18. The reference detector 18 is used in the way described above (FIG. 1). An aperture 33 is provided in front of the reference detector 18. Since parts of the illumination light 8 do not emerge from the beam splitter 11 until after single or multiple reflection, reflections 35 offset parallel to the reference beam 39 occur. These reflections 35 are blocked from the reference detector 18 by the aperture 33. In the same way, reflections 36, which are offset parallel to the illumination light 8, occur on the side of the beam splitter 11 that has the coating 31. These reflections 36 are likewise removed from the illumination light 8 by an aperture 32. On the same path as that taken by the illumination light 8 to the sample, the detection light 15 returns, passes through the coating 31 and the substrate 30 and, after emerging from the beam splitter 11, strikes the detection pinhole 16. As already described above, reflections 37, which are offset parallel to the detection light 15, also occur here owing to the beam splitter 11. These reflections 37 are stopped out by the detection pinhole 16 before they would reach the detector 17 (see FIG. 1).

Figure 3:
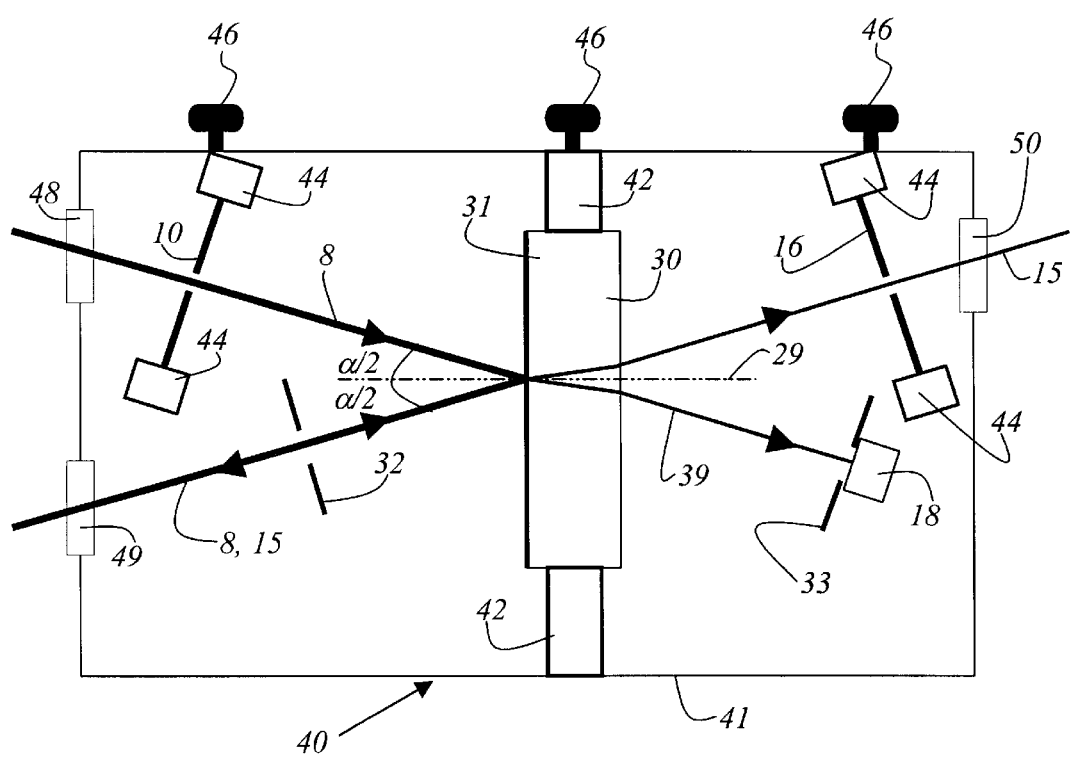
FIG. 3: shows a schematic representation of a beamsplitter module according to the present invention.

FIG. 3 shows the beam splitter 11, with the additional component parts which were already described in FIG. 2, as a single optical component 40 which can be inserted into the beam path of a confocal scanning microscope. The optical component 40 consists of a casing 41, which encloses the beam splitter 11, the illumination pinhole 10, the detection pinhole 16, the reference detector 18 with assigned aperture 33, and the aperture 32 in the illumination light 8 after reflection from the coating 31. The casing 41 comprises a first opening 48, through which the illumination light 8 enters the component 40. A second opening 49, through which the illumination light 8 reflected by the coating 31 of the substrate 30 emerges from the casing 41 and reaches the sample 14, is provided in the casing 41. Through the second opening 49, the detection light 15 reflected and/or emitted by the sample 14 returns into the casing 41. Through a third opening 50 in the casing 41, the detection light 15 transmitted by the beam splitter 11 passes through the detection pinhole 16 to the detector 17 (see FIG. 1). The reference detector 18 is arranged in a fixed position with respect to the beam splitter 11 in the casing 41. The beam splitter 11 is mounted in the casing 41 using a holding device 42. At least one adjustment means 46 acts on the holding device 42, so that it is possible to adjust or position the beam splitter 11 accurately. The illumination pinhole 10 and the detection pinhole 16 are each mounted in the casing 41 using a holding device 44. An adjustment means 46 also respectively acts on the two holding devices 44, so that the precise alignment of the illumination pinhole 10 and the detection pinhole 16, respectively, can be set. The adjustment means 46 may be configured e.g. so that they can be manually set by the user. It is furthermore possible for the adjustment means 46 to be configured so that they can be automatically set electromechanically or using other means. The adjustment means 46 can be monitored and controlled using a computer (not shown). Combining the means needed for distributing a light beam to form the optical component 40 is particularly advantageous since, depending on the configuration of the scanning microscope used by the user, this part can be fitted into the scanning microscope. Furthermore, the various elements such as beam splitter 11, illumination pinhole 10 and detection pinhole 16 are enclosed by the casing 41, so that inadvertent misalignment of the elements is impossible.

The invention has been described with reference to a particular embodiment. It is, however, obvious that modifications and amendments may be made without thereby departing from the scope of protection of the following claims.

PARTS LIST 1 pulse laser
2 laser beam
3 input lens
4 optical component
5 first lens
6 broadband illumination light
7 wavelength-selecting and/or intensity-selecting means
8 illumination light
9 second lens
10 illumination pinhole
11 beam splitter
12 scanning mirror
13 objective
14 sample
15 detection light
16 detection pinhole
17 detector
18 reference detector
20 control electronics
29 normal to the beam splitter
30 substrate
31 coating
32 aperture
33 aperture
35 reflection
36 reflection
38 third beam splitter
39 reference beam
40 optical part
41 casing
41 holding device
42 holding device
43 adjustment means
44 first opening
45 second opening
46 third opening
α/2 angle

What is claimed is:

1. A scanning microscope comprising: an objective being arranged in both an illumination beam path and a detection beam path, an illumination pinhole being arranged in the illumination beam path, a detection pinhole being arranged in the detection beam path, an optical component arranged in the illumination beam path, which generates spectrally broadened illumination light, an essentially polarization-independent and wavelength-independent beam splitter, which is arranged in a fixed position in the illumination beam path and the detection beam path and a casing, wherein the polarization-independent and wavelength-independent beam splitter, the illumination pinhole, the detection pinhole and a reference detector are arranged.

2. A scanning microscope according to claim 1, further comprising a light source with at least one laser, wherein the light emitted by the light source is injected into the optical component and wherein the optical component consists of microstructured material.

3. A scanning microscope according to claim 2, wherein the at least one laser is a pulsed laser.

4. A scanning microscope according to claim 1, wherein the polarization-independent and wavelength-independent beam splitter is arranged such that the illumination light is incident with respect to the normal of the beam splitter at an angle (α/2) which is such that polarization effects are minimal.

5. A scanning microscope according to claim 4, wherein the angle (α/2) with respect to the normal of the beam splitter is in the range of from 1 to 30 degrees.

6. A scanning microscope according to claim 1, further comprising: a control electronics and a reference detector arranged in a reference beam defined by the beam splitter and receiving light passing through the beam splitter, wherein the reference detector derives an electronic value that is submitted to the control electronics.

7. A scanning microscope according to claim 6, further comprising: an intensity-selecting means connected to the control electronics, wherein the control electronics is controlling the intensity of the illumination light such that there is always a constant light power at the sample.

8. A scanning microscope according to claim 1, further comprising: at least one adjustment means for adjusting the beam splitter, the illumination pinhole and the detection pinhole.

9. A scanning microscope according to claim 1, further comprising a light source with at least one laser, wherein the light emitted by the light source is injected into the optical component and wherein the optical component comprises microstructured material.

10. An optical component for use in an illumination beam path and detection beam path of a scanning microscope comprising: a polarization-independent and wavelength-independent beam splitter, an illumination pinhole, a detection pinhole, a reference detector and at least one adjustment means for adjusting the beam splitter, the illumination pinhole and the detection pinhole.

11. An optical component according to claim 10, further comprising a casing, which contains the beam splitter, the illumination pinhole, the detection pinhole and the reference detector, wherein the casing is arranged in the illumination beam path and the detection beam path of the scanning microscope such that the illumination light is incident with respect to the normal of the beam splitter at an angle which is such that polarization effects are minimal.

12. An optical component according to claim 11, Wherein the casing has a first opening for entry of the illumination light, a second opening for exit of the illumination light and for entry of the detection light, and a third opening for exit of the detection light.

13. An optical component according to claim 10, wherein the scanning microscope comprises a light source with at least one laser, wherein the light emitted by the light source is injected into the optical component and wherein the optical component comprises a microstructured material.

14. An optical component according to claim 10, wherein the beam splitter consists of a substrate and a reflective coating.

15. An optical component according to claim 10, further comprising: a control electronics and a reference detector arranged in a reference beam defined by the beam splitter and receiving light passing through the beam splitter, wherein the reference detector derives an electronic value that is submitted to the control electronics.

16. An optical component according to claim 15, further comprising: an intensity-selecting means connected to the control electronics, wherein the control electronics is controlling the intensity of the illumination light such that there is always a constant light power at the sample.

17. An optical component according to claim 10, wherein, in a casing arranged in the illumination beam path and the detection beam path, the beam splitter is arranged in a fixed position with respect to the illumination beam path and the detection beam path.

18. An optical component according to claim 10, wherein the beam splitter comprises a substrate and a reflective coating.

* * * * *